March 27, 1962 K. LIPMAN 3,027,467

PROXIMITY SWITCHING APPARATUS

Filed Aug. 27, 1958

WITNESSES

Leon J. Jaza

Myron E. Click

INVENTOR

Kenneth Lipman

BY F. E. Browder

ATTORNEY

United States Patent Office 3,027,467

Patented Mar. 27, 1962

3,027,467

PROXIMITY SWITCHING APPARATUS

Kenneth Lipman, Pittsburgh, Pa., assignor to Westinghouse Electric Corporation, East Pittsburgh, Pa., a corporation of Pennsylvania Filed Aug. 27, 1958, Ser. No. 757,512
3 Claims. (Cl. 307—88.5)

This invention relates in general to proximity detection apparatus and in particular to proximity detecting apparatus having a digital or switching output.

Use of static switching devices has greatly increased the length of trouble-free operation time for machine tool and other types of control. The use of mechanical limit switches as input devices to these control systems is a serious deficiency because of the limited number of operations of even the most expensive types. For example, operations as high as several million may be performed in a few months in some machine tool apparatus. Industrial interest, therefore, is now being focused on replacing various input devices for control systems whose usefulness is limited by mechanical and electrical failure.

It is an object of this invention to provide an improved proximity switching apparatus.

It is another object of this invention to provide a proximity switching device whose life is essentially independent of the number of operations.

It is still another object of this invention to provide an improved proximity switching device featuring reliability, simple adjustment, fast operation and a high repetition rate.

Further objects of this invention will become apparent when the following description is taken in conjunction with the accompanying drawings. In said drawings, for illustrative purposes only, there is shown a preferred embodiment of the invention. In said drawings, the manner in which the windings have been wound upon associated magnetic cores has been denoted by the polarity dot convention. That is dots placed at the end of the windings indicate like instantaneous points of polarity.

Figure 1:
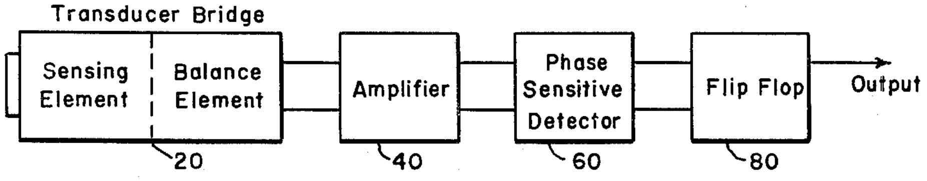
FIGURE 1 is a block diagram of a proximity switching device embodying the teachings of this invention.

Referring to FIGURE 1, there is shown an embodiment of this invention comprising a transducer bridge 20, an amplifier 40, a phase-sensitive detector 60 and a flip-flop element 80. The transducer bridge 20 is composed of a sensing element and a balance element. The output of the transducer bridge 20 is amplified by the amplifier 40 and fed through the phase-sensitive detector 60 to the input of the flip-flop element 80. The amplifier 40 amplifies the output of the transducer bridge 20 and the phase-sensitive detector 60 produces a direct current output to the flip-flop 80 in response to an input from the amplifier 40. The flip-flop element 80 supplies a snap action output signal in response to the proper polarity of direct current input from the phase-sensitive detector 60.

Figure 2:
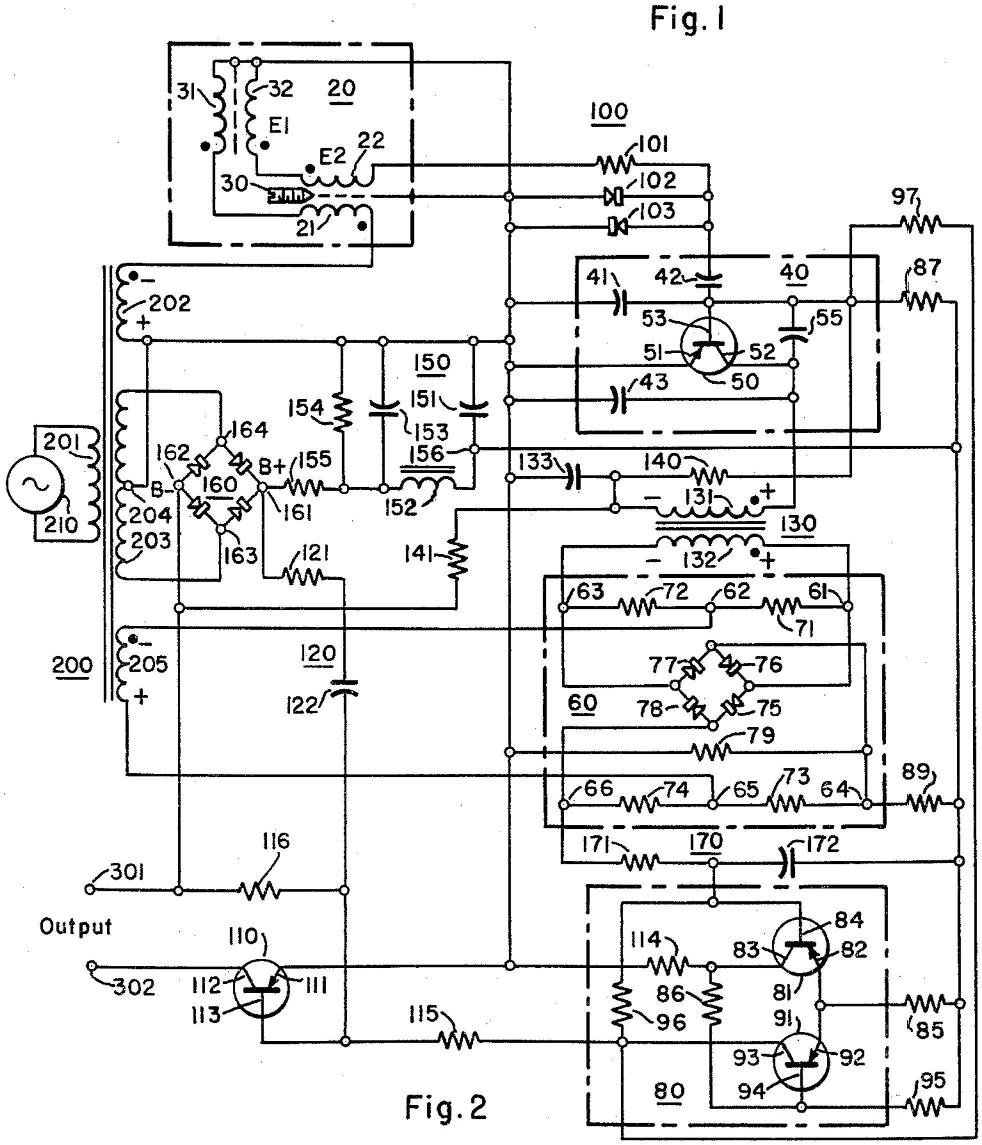
FIG. 2 is a schematic diagram of the apparatus illustrated in FIGURE 1 in the block form.

Referring to FIG. 2, there is illustrated a schematic embodiment of the teachings of this invention in which the main elements of FIGS. 1 and 2 have been given the same reference characters.

The transducer bridge 20 comprises a sensing element and a balance element. The balance element comprises a first winding 21 and a second winding 22. The sensing element comprises a first winding 31 and a second winding 32. The windings 21 and 31 are connected in series circuit relationship to a secondary winding 202 of a supply transformer 200. The windings 22 and 32 are connected in series circuit relationship between an emitter electrode 51 and a base electrode 53 of a transistor 50 of the amplifier 40.

The amplifier 40 comprises the transistor 50 having an emitter electrode 51, a collector electrode 52 and a base electrode 53. The emitter 51-collector 52 circuit of the transistor 50 is connected to be supplied from an alternating power source through a full-wave rectifier 160. The full-wave rectifier 160 has its input terminals connected to a secondary winding 204 of the supply transformer 200. A capacitor 42 and a resistor 101 are connected in series with the windings 22 and 32 of the transducer bridge between the base electrode 53 and the emitter electrode 51. A rectifier 102 and a rectifier 103 are connected in parallel with opposite polarities across the emitter 51 and the junction of the resistor 101 and the input capacitor 42. The resistor 101, rectifier 102 and rectifier 103 comprises a protective device 100 to prevent overdriving the transistor device 50.

The emitter 51-collector 52 circuit of the transistor 50 is connected in series with a primary winding 131 of a coupling transformer 130 and resistor 141 across the voltage supplied by the full-wave rectifier 160. The resistor 141 in cooperation with a capacitor 133, connected across the output of the full-wave rectifier 160, provides pure D.C. power for the transistor. The capacitor 43 connected across the emitter 51-collector 52 circuit of the transistor 50 provides phase angle compensation of the output of the amplifier circuit 40. The phase angle compensation is with reference to the phase-sensitive detector 60 and thus is with reference to the coupling transformer 130 which couples the output of the transistor amplifier 40 input to the phase-sensitive detector 60.

The phase-sensitive detector 60 comprises input terminal means 61 and 63 having serially connected therebetween a resistor 71 and a resistor 72. A pair of output terminals 64 and 66 of the phase-sensitive detector has serially connected therebetween a resistor 73 and a resistor 74. The terminal 61 is connected to the terminal 66 through a rectifier 75. Terminal 61 is connected through the rectifier 75 and a rectifier 78 to the terminal 63. The terminal 66 is connected through the rectifier 78 to the terminal 63. The terminal 63 is connected through the rectifier 77 and a rectifier 76 to the terminal 61. The terminal 63 is connected to the terminal 64 through a rectifier 77. A source of reference voltage for the phase-sensitive detector 60 is supplied by a secondary winding 205 of the supply transformer 200. The secondary winding 205 is connected between a terminal 62, the junction of the resistors 71 and 72, the terminal 65, the junction of the resistors 73 and 74. The output of the phase-sensitive detector 60 from the terminals 64 and 66 is connected through a filter 170 to a base electrode 84 of a transistor 81 of the flip-flop element 80. The filter 170 comprises a resistor 171 connected between the terminal 66 and the base electrode 84, and a capacitor 172 connected between filtered B+ terminal 156 and the base electrode 84. A filter 150 comprising capacitors 151 and 153, resistance 154 and a choke inductance 152 filters the output of the rectfier 160.

The flip-flop element 80 comprises a pair of three electrode transistor devices 81 and 91. The transistor 81 comprises an emitter electrode 82, a collector electrode 83 and the base electrode 84. The transistor 91 comprises an emitter electrode 92, a collector electrode 93 and a base electrode 94. The emitter electrodes 82 and 92 are connected through a resistor 85 to the fitlered B+ side of the power supplied by the full-wave rectifier 160 from the secondary winding 204 of the transformer 200. The collector electrode 83 is connected through a feedback resistor 86 to the base electrode 94 of the transistor 91. The collector electrode 93 of the transistor 91 is connected through a feedback resistor 96 to the base electrode 84 of the transistor 81. The emitter electrodes 82 and 92 are connected through the resistor 85 and a feedback resistor 97 to the base electrode 53 of the transistor 50 of the amplifier 40. The collector electrode 93 of the transistor 91 is connected through the feedback resistor 97 to the base electrode 53 of the transistor 50. The base electrode 94 of the transistor 91 is connected through a resistor 95 to the filtered B+ side of the full-wave rectifier 160.

An output means for the proximity switching apparatus is provided by the transistors 110 which comprises a semiconductive body having an emitter electrode 111, a collector electrode 112 and a base electrode 113. The collector electrode 93 of the transistor 91 is connected through a resistor 115 to the base electrode 113 of the transistor 110. The collector electrode 83 of the transistor 81 is connected through a resistor 114 to the emitter electrode of the output transistor 110. The base electrode 113 of the transistor 110 is connected through a filter 120 to the B+ side of the supply rectifier 160. The filter 120 comprises a serially connected capacitor 122 and a resistor 121. The emitter electrode 111-collector electrode 112 circuit of the transistor 110 is connected to be supplied from the B− terminal of 162 of the full-wave rectifier 160.

The transducer bridge 20 has the windings 21 and 31 connected in series and the windings 22 and 32 connected in series opposition so that a null signal to the amplifier 40 is obtained when the proper inductance ratio is achieved. If the exciting currents from the primary winding 202 are identical and the induced voltages appearing across the windings 22 and 32 are almost 90° out of phase with the current through the windings 21 and 31, a null signal is obtained without the need of a critical resistive balance. The balance element may have the balancing varied to set the null point from infinity to direct contact of the sensing element by moving a piece of magnetic material 30 towards the balancing element. In practice, this is most usually accomplished by potting or incapsulating the windings 21 and 22 in a suitable compound and having the magnetic material 30 provided in the form of a screw which may be moved toward and away from the windings 21 and 22 by screw threads formed in the potting or incapsulating medium enclosing the windings 21 and 22. Therefore, the point of balance of the transducer bridge 20 can be set easily by moving an iron screw 30 in and out of the vicinity of the balance windings 21 and 22.

When the sensing windings 31 and 32 and the balance windings 21 and 22 are identical and mounted in similar enclosures, a sharp null may be obtained. In practice, however, it may be necessary to use different core sizes to get sufficient inductive change out of the balance coil when passing a readily available steel or iron screw 30 through its opened end. The increased inductance due to the longer core of the balance element may be compensated for by decreasing the turns of the winding 22 of the balance element. In addition, the balance and sensing elements may be mounted in different types of enclosures. The sensing element should be mounted within a magnetic shield so that it will be sensitive to the appearance of a magnetic material whose proximity is being sensed only when the material or job is directly over the sensing face. The magnetic shield around the sensing element would minimize any stray induction or pickup by the sensing element when approached from the sides. The balance element comprising the winding 21 and 22 may be mounted, potted or incapsulated with the remainder of the circuit in FIG. 2.

Whenever a magnetic workpiece is moved within range of the sensing element, i.e., the windings 31 and 32, an induced voltage $E_1$, appears across the winding 32 which is larger than the induced voltage $E_2$ appearing across the winding 22 of the balance element. The resultant voltage is applied to the amplifier 40.

The exciting power for the transducer bridge 20 supplied by the primary winding 202 is not a pure sine wave except in rare cases. Also, there is a significant out-of-phase output from the transducer bridge due to eddy current loading. These factors combine to raise the minimum null output of the transducer bridge 20 to the amplifier 40 higher than the signal level required for the amplifier 40 to trip the flip-flop 80.

The above problems have been minimized in the apparatus of FIG. 2 by the following procedures. It is noted that the supply frequency component of the induced voltage across the windings 22 and 32 remains the same as long as the product of the primary and secondary turns of the balance and sensing elements remains fixed. This is true because in a high leakage magnetic circuit only a fraction of the total voltage drop is inductive in the primary winding. The inductive drop increases almost linearly with the number of primary turns and the induced voltage is proportional to the secondary turns.

Although the magnitude of the supply frequency induced voltage remains constant with the turns product, the higher order harmonic and circuit losses change because the external physical structure has remained fixed while the exciting or primary windings of the balance and sensing elements has been altered.

The output of the transducer bridge 20 is applied to the amplifier 40. The transistor 50 of the amplifier 40 is operated for linear amplification within the range of its characteristics. Therefore, the output of the transducer 20 is amplified by the transistor 50 and applied to the primary winding 131 of the coupling transformer 130. A voltage induced on the secondary winding 132 of the coupling transformer 130 is applied to the input terminals 61 and 63 of the phase-sensitive detector 60.

The operation of the phase-sensitive detector 60 is as follows. Two circuits are connected:

(1) when terminal 62 is positive with respect to terminal 65, and (2) when terminal 65 is positive with respect to terminal 62.

These two polarities are supplied by the primary winding 205 of the transformer 200 which supplies a reference voltage to the phase-sensitive detector 60. Circuit 1 may be traced from one side of the primary winding 205 through the resistor 71, rectifier 75 and a resistor 74 to the other side of primary winding 205. A parallel path of circuit 1 exists from the terminal 62 through the resistor 72, rectifier 77, and the resistor 73 to the terminal 65. If the value of the resistors 71 and 72 are equal and the value of the resistors 73 and 74 are equal, and if the rectifiers 75 and 77 have identical characteristics, no output voltage across the terminals 64 and 66 will appear if the input voltage at the terminal 61 and 63 is zero because of equal voltage drops across the resistors 73 and 74.

Circuit 2 may be traced from a terminal 65 through the resistor 74, the rectifier 78, the resistor 72 to the terminal 62. A parallel path for circuit 2 exists from terminal 65 through the resistor 73, the rectifier 76, and the resistor 71 to the terminal 62. Assuming the same conditions as in the previous paragraph, if the voltage across the terminal 61 and 63 is zero there will be no output voltage at the terminal 64 and 66. If the reference voltage from the primary winding 205 is made larger than an input voltage appearing at the terminals 61 and 62, then, with the polarities as shown in FIG. 2, an increased voltage drop will appear across the resistor 73 and a reduced voltage drop across the resistor 74 producing an output voltage at the terminal 64 and 66. A half-cycle later, when circuit 2 is closed because the polarity on the reference voltage supplied by the winding 205 is reversed from that shown and the input voltage to the terminals 61 and 62 also reversed from the polarity shown, an increased voltage drop will appear across the resistor 73 and a reduced voltage drop appears across the resistor 74 to be producing an output with polarity as shown from the output terminal 64 and 66. Thus, a full-wave, direct current output is produced from the phase-sensitive detector 60 upon the application of an input voltage with instantaneous polarities, as discussed, to the input terminals 61 and 63. If the input voltage applied to the terminals 61 and 63 is reversed in phase while the reference is supplied by the winding 205 is kept in the same phase, the output voltage appearing at the output terminals 64 and 66 will have the same magnitude assuming the same magnitude for the voltages, but opposite polarity to the output of the preceding paragraph.

The flip-flop element 80 has been, and is normally, in the "off" condition. That is, the transistor 91 has been conducting and the transistor 81 has been cut off. The output from the terminal 64 and 66 of the phase-sensitive detector 60, with polarity is shown in FIG. 2, is of the proper polarity to bias the transistor 81 to conduction and toward saturation. The conduction in the emitter 82-collector 83 circuit of the transistor 81 feeds back a signal through the resistor 86 to the base electrode 94 of the transistor 91 which is of a polarity to start driving the transistor 91 towards cutoff. As conduction through the emitter 92-collector 93 circuit of the transistor 91 decreases, the potential on the emitter electrode 82 of the transistor 81 rises. This potential rise on the emitter 82 of the transistor 81 effectively lowers the bias potential between the emitter 82 of the base electrode 84 of the transistor 81 allowing it to be driven further towards saturation. The two effects just described cooperate to produce a snap action switching operation of the flip-flop element 80.

The abrupt change in the output state of the flip-flop element 80, although desirable as far as allowing the output transistor 110 to be switched to conduction, produces changes in loads and impedances in various other parts of the circuit. These changes in turn may show up in the input to the proximity switching apparatus in such a form that the apparatus will break into a lower frequency oscillation.

These sources of false signal may be a change in excitation to the transducer bridge if the proximity unit switches state. In addition, both the transistor 50 of the amplifier 40 and the phase-sensitive detector 60 are bilateral devices which may feed back a signal when the flip-flop element 80 switches state.

The change in the B+ or supply voltage has the most significant effect on the amplifier 40. Because of high temperature leakage, a circuit should be chosen to give the greatest amount of compensation without affecting gain, and the operating current in the output of the transistor 50 should be made small to prevent saturating the coupling transformer 130. The resistor 97, connected from the collector 93 of the transistor 91 to the base electrode 53 of the transistor 50, feeds back a signal from the output of the flip-flop element 80 which cancels the change in the amplifier 50 transistor current due to the B+ voltage changes caused by the switching of the flip-flop element 80. In addition, the signal fed back through the resistor 97 is of the proper phase to prevent a hunting effect in the amplifier 40.

The capacitor 55, connected between the collector 52 and the base 53 of the transistor 50, minimizes feedback through the amplifier 40 without an excessive loss in gain of the supply frequency signal furnished by the transducer bridge 20.

To further insure stability of the apparatus, the resistor 96 has been connected between the collector electrode 93 of the transistor 91 and the base electrode of the transistor 81. The bilateral nature of transistors makes it more load sensitive than vacuum tube circuits. If the output load changes, the trip voltage as applied to the flip-flop element 80 from the phase-sensitive detector 60 is affected due to collector to emitter (and base) feedback as a function of the load. In general, the lower the output load resistance, the greater the trip voltage. This change in sensitivity may be eliminated by the feedback arrangement of the resistor 96. The resistor 96 supplies a current to the input of the flip-flop 80. The greater the output voltage swing as the load resistance increases, the larger the feedback signal through the resistance 96. Thus, the changes are such that the trip voltage increases as a function of feedback. Without the feedback through the resistor 96, the trip voltage increases as load resistance decreases while the portion of the trip voltage due to feedback decreases. By properly balancing the output-input and common resistor feedback, it is possible to achieve a condition where the snap action of the flip-flop element 80 is independent of the load.

The feedback resistor 96 not only compensates for the difference in loads assuring uniform performance from application to application of the proximity apparatus, but it also supplies the base drive for the input transistor 81 thus minimizing the signal fed back through the phase-sensitive detector and, therefore, minimizing the need for a larger filter 170 between the phase-sensitive detector 60 and the flip-flop 80. The filter 170 should be kept small to prevent loss of maximum switching rate.

The output transistor 110 should act as much like a true switch as possible. To do this, sufficient base drive must be supplied to the transistor 110 to keep it saturating during a full 360°. On the other hand, it is desirable to drive the transistor 110 from pulsating direct-current through the resistor 116 to the base 113 if this type of supply is used for the output load connected to the terminals 301 and 302. If a pulsating direct-current is used as a base drive for the transistor 110, the transistor 110 tends to go out of saturation at zero degrees and 180°. The filter network 120 hereinbefore described utilizing the series combination of the capacitor 122 and resistor 121 filters the drive to the transistor 110 to the extent of slightly limiting the peak drive current, but more important keeps the transistor 110 in saturation during the entire 360°.

By connecting one end of the output power transistor filter 120 to B+, supplied from the full-wave rectifier 160 instead of ground, the output transistor 110 cannot deliver an output for a predetermined period when the apparatus of FIG. 2 is first connected to the power line. This is because the capacitor 122 must be charged before the filter will effectively operate. If the output transistor 110 is supposed to be cut off when power is supplied, the delay furnished by the filter 120 will prevent false operation long enough for the various circuits to stabilize. This is very important when working into certain types of logic units or very fast relays.

In conclusion, it is pointed out that while the illustrated example constitutes a practical embodiment of my invention, I do not limit myself to the exact details shown, since modification of the same may be varied without departing from the spirit and scope of this invention.

I claim as my invention:

1. A proximity switching apparatus comprising: a transducer bridge; an amplifier; a phase-sensitive detector; and a flip-flop element having two output states; circuit means havinga n input and an output connecting said amplifier and said phase-sensitive detector in circuit relationship; said transducer bridge being connected to said input of said circuit means; said output of said circuit means being connected to said flip-flop element; said amplifier and phase-sensitive detector being operative to amplify and detect respectively a predetermined phase of signal from said transducer bridge; said amplified and detected signal being operative to cause said flip-flop element to change output states; and means for feeding back to said amplifier a portion of the resulting output state to oppose any change in operating current in the output of said amplifier due to switching of output states by said flip-flop element.

2. A proximity switching apparatus comprising: a transducer bridge; an amplifier; a phase-sensitive detector; and a flip-flop element having two output states; circuit means having an input and an output connecting said amplifier and said phase-sensitive detector in circuit relationship; said transducer bridge being connected to said input of said circuit means; said output of said circuit means being connected to said flip-flop element; said amplifier and phase-sensitive detector being operative to amplify and detect respectively a predetermined phase of signal from said transducer bridge; said amplified and detected signal being operative to cause said flip-flop element to change output voltage states; and means for feeding back to the input of said flip-flop element a portion of the output of said flip-flop element proportional to the output voltage swing.

3. A proximity switching apparatus comprising: a transducer bridge; an amplifier; a phase-sensitive detector; and a flip-flop element having two output states; circuit means having an input and an output connecting said amplifier and said phase-sensitive detector in circuit relationship; said transducer bridge being connected to said input of said circuit means; said output of said circuit means being connected to said flip-flop element; said amplifier and phase-sensitive detector being operative to amplify and detect respectively a predetermined phase of signal from said transducer bridge; said amplified and detected signal being operative to cause said flip-flop element to change output voltage states; means for feeding back to said amplifier a portion of the resulting output voltage state to oppose any change in operatnig current in the output of said amplifier due to switching of output voltage states by said flip-flop element; and means for feeding back to the input of said flip-flop element a portion of the output of said flip-flop element proportional to the output voltage swing.

References Cited in the file of this patent

UNITED STATES PATENTS

| | | |
|---|---|---|
| 1,971,549 | Woodward | Aug. 28, 1934 |
| 2,489,920 | Michel | Nov. 29, 1949 |
| 2,494,579 | Pimlott et al. | Jan. 17, 1950 |
| 2,831,113 | Weller | Apr. 15, 1958 |
| 2,864,007 | Clapper | Dec. 9, 1958 |

FOREIGN PATENTS

| | | |
|---|---|---|
| 622,962 | Great Britain | May 10, 1949 |
| 699,853 | Great Britain | Nov. 18, 1953 |
| 704,476 | Great Britain | Feb. 24, 1954 |